United States Patent Office 3,373,085
Patented Mar. 12, 1968

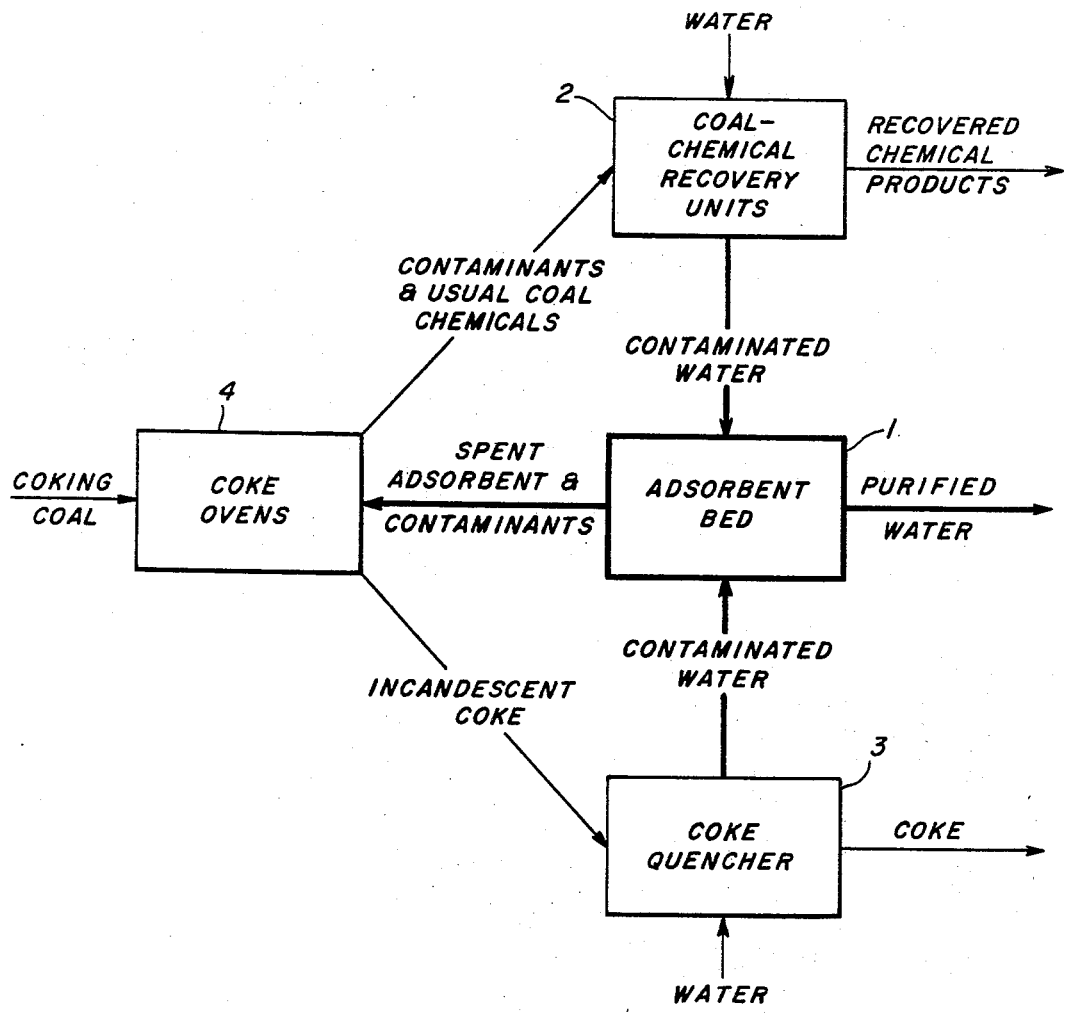

3,373,085
METHOD OF PURIFYING COKE-WORKS WASTE LIQUOR
Philip X. Masciantonio, Penn Township, Westmoreland County, Pa., assignor to United States Steel Corporation, a corporation of Delaware
Filed Sept. 12, 1962, Ser. No. 223,181
5 Claims. (Cl. 201—21)

This invention relates to the removal of contaminants from coke-works waste waters and the like, to render them suitable for further use or discharge into streams, and to the reclamation of the contaminating substances as useful chemicals.

Typical wastes advantageously treated by my invention are those from the ammonia stills of by-product coke works and coal gas plants, which contain highly obnoxious stream pollutants. Of the contaminants present in the waste waters, the organic compounds are most troublesome of disposal. These include phenol and its homologues, all of which are commonly grouped under the term phenols.

Various expedients have been employed to dispose of the offending wastes, the most generally used being evaporation by spraying onto incandescent coke. However, serious corrosion of adjacent coke-works equipment results from this practice, and the presence of contaminants on the coke leads to subsequent problems in blast furnace wastes and impairs its value as domestic coke.

Methods for recovering the chemical constituents from these waters are generally impractical, since the contaminants are present in low concentrations and the expense of removing them outweighs their value. Removal of the phenols by adsorbents, such as charcoal, has been proposed. However, regeneration or discard of spent adsorbent is expensive, and any chemical recovery was impractical due to equipment requirements and operating expenses.

My invention permits purification of the coke-works waste waters and the like, and reclamation of their chemical constituents without necessity for special facilities, other than a bed of suitable adsorbent, which is used in combination with conventional by-product coke-works equipment and the like. Although the contaminants are removed by adsorption, the adsorbent used requires no regeneration or discard and the adsorbed chemicals are recovered relatively effortlessly, utilizing usual by-product recovery practices.

The strategy and mode of operation of my invention, together with the equipment and materials required, will become further apparent upon reference to the single figure of the drawing. This depicts a flow diagram of a preferred practice of my invention, wherein an adsorbent bed 1 is in functional relationship with conventional equipment of a by-product coke works, comprising coal chemical recovery units 2, coke quencher 3, and coke ovens 4.

The invention contemplates use of a carbonaceous adsorbent agent in bed 1 which is a suitable coke-oven charge component, either by virtue of its coke-forming qualities or its compatibility with other coke-making charges, to produce metallurgical coke or other carbonized products of desired characteristics. Specific examples of preferred adsorbents, which will be described more fully hereinafter, are bituminous coal and bituminous coal treated to increase its adsorptive activity for organics such as phenols.

In the drawing, the adsorbent bed 1 is shown as receiving contaminated waters of the type aforementioned from the coal chemical recovery units 2 and the coke quencher 3. In the further operation of the process, upon adsorption of contaminants, including the organic compounds and ammonia, the resulting purified water is separated from the adsorbent and the latter, after having spent its adsorptive capacity, is charged into the coke ovens 4, carrying with it the adsorbed contaminants. Upon carbonization of the charge in the coke ovens 4 the contaminants are driven off, along with the usual coal chemicals, whereupon they are available for processing in the coal-chemical recovery units 2 for recovery of useful chemical products.

Since the invention permits of operation in conjunction with usual coke-works practices, coking coal is shown as being charged into the coke ovens 4. Also, incandescent coke, which includes coke-making components from the adsorbent, is shown as being fed to the coke quencher 3, which along with the coal-chemical recovery units 2, is shown as receiving water for the respective processes involved.

The adsorbent bed, insofar as structural arrangement is concerned, may be of any suitable type, such as would occur to persons familiar with the use of solid adsorbents for the removal of dissolved constituents from liquids. A bed arranged for continuous operation is preferred.

As to the adsorbent agent itself, and preferred conditions attending the adsorption process, additional information is presented by way of examples and further discussion. Since coke of recognized characteristics for use in iron-producing blast furnaces is especially valuable, the examples are largely directed to adsorbent coals adapted to form a component of coke of this so-called metallurgical quality. However, it is to be understood that other carbonaceous adsorbents may be employed if a carbonized product of other characteristics is acceptable or desired.

Various adsorbents are suitable for use in practicing my invention. One guide in selecting or preparing adsorbents is based on the consideration that adsorptive surfaces possess chemical structures which supply active sites for adsorption. Ordinary bituminous coal contains oxygen that can serve as active sites for the adsorption of polar organic compounds, such as the chemicals in question.

Since these active sites must be readily available for interaction with polar organic contaminants in the waste liquors, it is necessary that the coal be of a very fine particle size, or there must be sufficient quantities of a larger-sized adsorbent. Either of these requirements can be readily attained in the proposed process, since fresh adsorbent is available in large quantities as feed material for the coke ovens.

To improve the activity of the coal, several procedures have been employed. If bituminous coal is subjected to air blowing at temperatures between 50° and 200° C. for several hours, sufficient oxygen is added to the coal structure to increase the activity of the coal as an adsorbent. Since prolonged air oxidation destroys the coking properties of the coal, it is necessary to control the oxidation with respect to both time and temperature to avoid deleterious effects. A very active adsorbent can be made from coal by subjecting the material to a molten-caustic treatment at temperatures ranging from 200° to 450° C. This process has been described in my co-pending patent application Ser. No. 139,756 filed Sept. 21, 1961, now Patent No. 3,166,483. A finely divided adsorbent with slightly increased oxygen content can be prepared in this manner. Since large quantities of water are required in washing coal that has been caustic treated by the method of the above-cited disclosure, contaminated coke-works water is advantageously utilized for this purpose.

The adsorptive effectivness of carbonaceous materials for the principal contaminants was found to depend not only upon its oxygen content but also upon the acidity or basicity of the contaminated water, which latter condition is expressed on the generally accepted pH scale representing the logarithm of the reciprocal of the hydrogen-ion concentrations, wherein a pH of 7 represents neutrality. It has been found that good purification results only if the contaminated water is maintained at a pH ranging between 5 and 9. Improved adsorption occurs in the pH range of 7 to 8.5 and optimum conditions appear to exist near a pH of 7 (neutral). The pH of the waste waters may be adjusted towards neutral as required to improve adsorbability, by adding acid or caustic.

Several examples are included to further describe this invention.

Example 1

A 100-gram sample of washed, minus 40-mesh Robena coal was slurried with 200 grams of contaminated liquor (pH 8.5) from the coal-chemical-recovery plant. The slurry was filtered and the filtrate was collected. The filtrate was light brown and somewhat cloudy. The phenol content of contaminated liquor was 700 p.p.m., whereas the treated water had a phenol content of 400 p.p.m.

Robena coal is a high volatile Pittsburgh Seam coal, characterized by the following typical analysis:

| Proximate analysis: | Percent |
|---|---|
| $H_2O$ | 1.05 |
| Volatile matter | 36.1 |
| Ash | 7.31 |
| Fixed carbon | 55.6 |
| Elemental analysis: | |
| Carbon | 78.4 |
| Hydrogen | 5.24 |
| Oxygen | 7.3 |
| Sulfur | 1.64 |

Example 2

Example 1 was repeated, except that the pH of the contaminated water was adjusted to a pH of 7 by addition of dilute sulfuric acid. The purified water was light yellow and clear and contained 80 to 100 p.p.m. of phenol. Examination of the coal used as the adsorbent for the water purification indicated normal behavior in a laboratory-scale carbonization.

Example 3

A 100-gram sample of coal of the type used in Examples 1 and 2 was treated with air in a fluidized bed at 100° C. for 24 hours. The oxidized coal was then slurried with contaminated water using the procedure described in Example 2. The filtrate was light yellow and had only a faint odor. Phenol content was found to be 50 to 70 p.p.m.

Example 4

Caustic soda (400 grams) was melted by heating to 400° C. While stirring, 100 grams of +¼-inch Robena coal were added to the slurry, which was maintained at 400° C. for 15 minutes. The coal was decanted off, drowned in 2 liters of water, and filtered to remove the excess caustic soda. After the coal was washed with a 0.05 percent sulfuric-acid solution to remove residual sodium from the coal, 200 grams of contaminated water (pH 8.5) having a phenol content of 700 p.p.m. were added to the coal bed and allowed to pass through it. The filtrate was light yellow, clear, and free of odor. The phenol content was analyzed at 13 p.p.m. The coal used as the adsorbent appeared to give a useful coke in laboratory carbonizations.

Highly satisfactory results are obtainable with contaminated water at a pH of 7 to 8.5, using an adsorbent such as molten-caustic-treated coal, which has been acid washed, and particularly good results were obtained using contaminated water at a pH near 7 (neutral) and adsorbent coal given molten-caustic treatment at 400° C. with subsequent acid washing.

Low-rank non-coking coals, such as Wyoming coal, have been found to be excellent adsorbents, as would be expected from their high oxygen content. However, their overall utility in the process depends on the characteristics desired in the coke product. The overall characteristics of the resulting coke may be modified by proper blending with other coals during coking, or by briquetting, for example.

While various processes and materials have been disclosed it is apparent that changes, substitutions and omissions may be made therein without departure from the spirit and scope of the invention.

I claim:
1. In a method of recovering phenol from coke-works waste water contaminated therewith, the steps comprising bringing said water into contact with coking coal, thereby permitting adsorption by the coal of phenol from the water, draining the water from the coal, and charging the coal into a coke oven.

2. The method of claim 1 wherein the contaminated water has a pH ranging between 5 and 9.

3. The method of claim 1 wherein the coal comprises bituminous coal.

4. The method of claim 1 wherein the coal comprises bituminous coal which has been subjected to air blowing.

5. The method of claim 1 wherein the coal comprises bituminous coal which has been subjected to molten caustic treatment.

References Cited

UNITED STATES PATENTS

| | | | |
|---|---|---|---|
| 1,323,239 | 12/1919 | Basore | 210—39 X |
| 1,323,251 | 12/1919 | Davis et al. | 210—39 X |
| 1,866,417 | 7/1932 | Mackert | 210—39 X |
| 2,613,181 | 10/1952 | Green et al. | 210—39 X |

MORRIS O. WOLK, *Primary Examiner.*

J. ZATARGA, *Assistant Examiner.*